July 23, 1963 J. W. HOWARD 3,098,972

TRANSISTORIZED PULSE GATE NOISE LIMITER

Filed Oct. 10, 1961

INVENTOR.

JAMES WESLEY HOWARD

BY

Huebner & Worrel

ATTORNEYS.

United States Patent Office 3,098,972

Patented July 23, 1963

3,098,972

TRANSISTORIZED PULSE GATE NOISE LIMITER

James Wesley Howard, 510 S. Gloster, Tupelo, Miss.

Filed Oct. 10, 1961, Ser. No. 144,141
1 Claim. (Cl. 325—319)

This invention relates to a device for use in conjunction with a transistorized communications receiver to provide instantaneous limiting of foreign noise pulses occurring in the receiver and to permit clear reception of messages having relatively low receiver signal strength, without interference from relatively high impulse noise levels.

This application is a continuation-in-part of application Serial No. 121,463, filed July 3, 1961, titled "Pulse Gate Noise Limiter."

Operation of the device of the present invention is completely automatic, and no switching is required. Receiver operation is influenced by the device of the present invention only when there is present a foreign noise impulse of a magnitude greater than that of the desired signal. Furthermore, the desired signal is never interrupted, but passes through the receiver in the normal manner and speed, without blanking or holding action.

The device of the present invention is particularly useful with transistorized mobile FM radio equipment, in which satisfactory clear signal reception is often prevented by man-made static, such as that produced by the ignition systems of automotive equipment, high-power lines, and other static producing devices or conditions closely proximate to the mobile receiver. Normally, such static may render the receiver practically ineffective, particularly if the mobile receiver is being operated close to the limit of the transmission range of the transmitter from which the desired signal originates.

Several forms of devices have been offered in an attempt to meet the foreign impulse problem in tube-type receivers, and a more limited number for transistorized receivers, but these other devices are complicated, expensive to manufacture, difficult to install in existing receivers, and non-automatic. These other devices are generally of the "blanking" type, which interrupt the signal carrier for a time sufficient to allow the foreign impulse to die. Some of them are bulky and cannot be readily installed in or with existing receivers. Others require substantial additional power for operation, which places an additional drain on the battery of the mobile unit in which the receiver is installed.

An object of the present invention is therefore to provide a device which will limit foreign impulse noises in a transistorized receiver so that said noises will not adversely affect clear signal reception, even at distances remote from a transmitter.

Another object of the invention is to provide a noise limiter for a transistorized FM receiver which will keep additional power consumption to a minimum.

Still another object of the invention is to provide such a device which is small and compact and readily installed in or with existing receivers.

A further object of the invention is to provide such a device which is simple and inexpensive to manufacture, assemble and install.

Still a further object of the invention is to provide such a device which uses standard components and does not require complicated circuitry.

Another object of the invention is to provide such a device which requires a minimum of service and which, even if out of order, will not interfere with the normal operation of, or disable, the standard receiver.

Still another object of the invention is to provide such a device which is completely automatic in operation so that, when installed, for instance, as a part of a mobile unit in a vehicle, no switching is required, and the operator of the vehicle may concentrate on his driving, without being required to give attention to the operation of a switch.

With these and other objects in view, the invention consists of the construction, arrangement and combination of the various parts of the device whereby the objects contemplated are attained, as hereinafter set forth, pointed out in the appended claims, and illustrated in the accompanying drawings.

Figure 1:
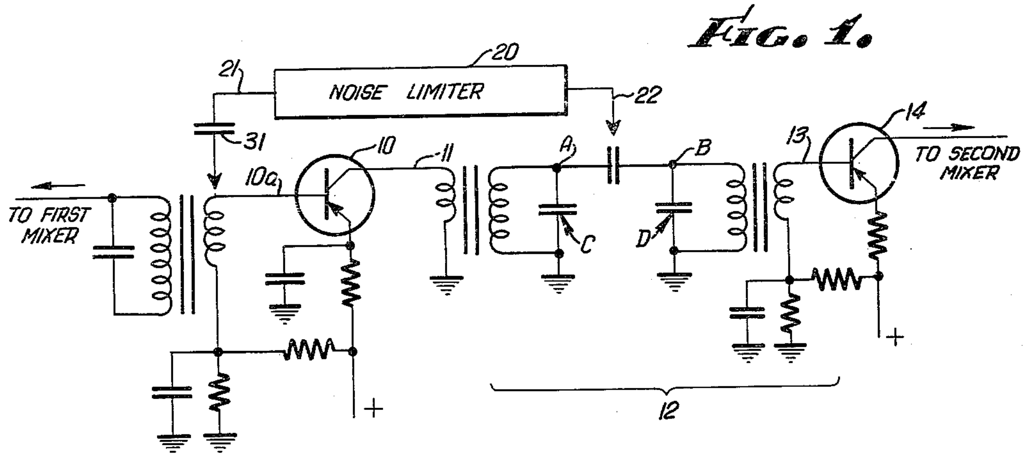
FIGURE 1 is a diagrammatic view showing the manner in which the device of the present invention is connected to a conventional radio receiver circuit.

Referring at first to FIGURE 1 of the drawings, a coupling capacitor 31 is connected to the base of a first IF amplifier transistor 10, which continuously samples the IF signal. The IF signal passes from a collector circuit 11 of transistor 10 through a filter circuit generally designated by the numeral 12, to a control element 13 of second first IF amplifier 14.

Figure 2:
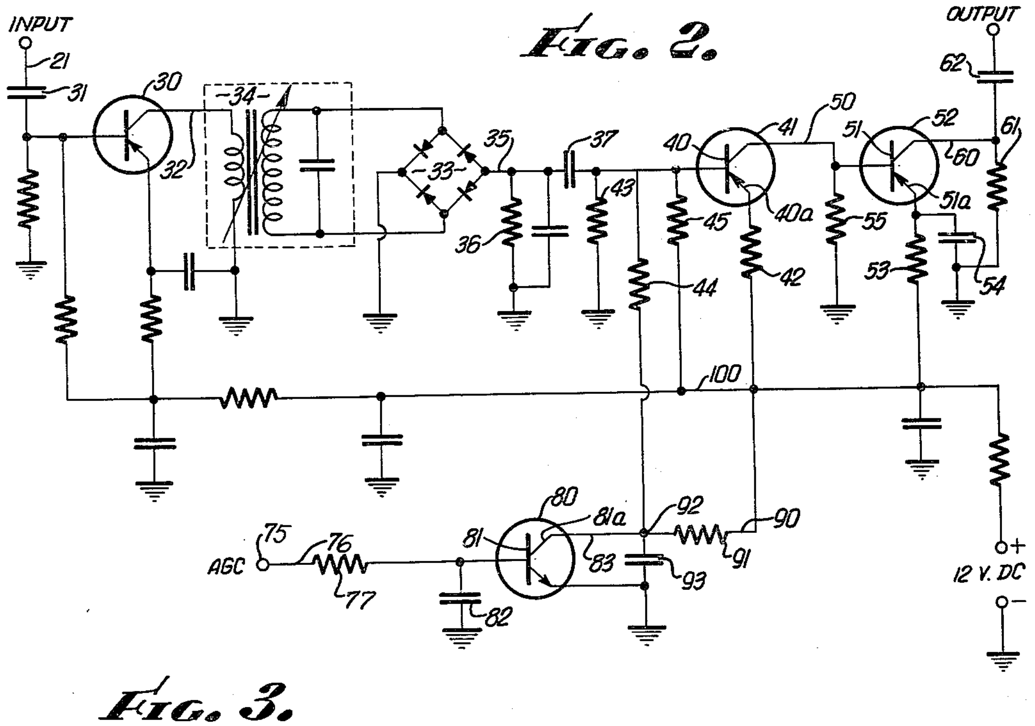
FIGURE 2 is a diagrammatic view showing details of a presently preferred embodiment of the device of the present invention.

The pulse gate noise limiter 20 of the present invention is shown in block diagram in FIGURE 1, and in detail in FIGURE 2. The input circuit 21 of noise limiter 20 is connected to the base circuit **10*a* of transistor 10 and to noise limiter 20 and serves to continuously conduct a sample of the IF signal from base circuit 10*a* of transistor 10 to noise limiter 20**.

Figure 3:
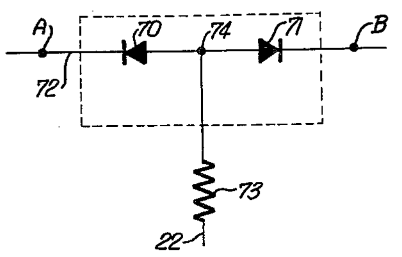
FIGURE 3 is a diagrammatic view showing an output connection of the device of the present invention to the RF signal path of a receiver.

FIGURE 3 illustrates means for introducing the negative pulses from limiter 20 into the receiver circuit. Two diodes 70 and 71 are disposed, in back-to-back relationship to each other, in the IF signal path 72 of the receiver after the first IF amplifier 10. The diodes 70 and 71 are connected in the IF circuit at points A and B to effect a means of coupling between tune circuits C and D shown in FIGURE 1.

The output circuit 22 of limiter 20 is coupled through a resistor 73 to a central connection 74 between the back-to-back diodes 70 and 71. By this means, the diodes 70 and 71 are biased by the negative pulses from limiter output circuit 22 when excessive noise pulses are present, and this biasing action will limit the amount of coupling of diodes 70 and 71, and hence the level or amplitude of the noise pulses passed on to subsequent stages of the receiver.

Referring to FIGURE 2 of the drawings, the input circuit 21 continuously feeds the sample of the IF signal to the base of a PNP transistor 30 through a suitable coupling capacitor 31. The sampled signal is amplified in transistor 30. The output circuit 32 of transistor 30 is coupled to a negative full wave diode bridge rectifier 33 by means of a conventional RF transformer 34 (shown in FIGURE 2 in the preferred form of a single-tuned circuit, although it will be readily recognized that a double-tuned circuit will perform adequately).

The output circuit 35 of bridge rectifier 33 is connected to the base 40 of a PNP transistor 41. A resistor 36 is connected to output circuit 35 of bridge rectifier 33 and to ground. A coupling capacitor 37 is connected to output circuit 35 of bridge rectifier 33 and used as a means of coupling the negative pulses coming from bridge rectifier 33 to the base 40 of transistor 41, which is positive biased.

Transistor 41 is directly coupled by means of output circuit 50 to the base 51 of a PNP transistor 52 in order to eliminate any phase shift or time constant which would occur if a coupling capacitor was used.

A resistor 42, connected to emitter 40*a* of transistor 41, controls the pulse shaping in output circuit 50 from transistor 41, and resistor 53 and by-pass capacitor 54, connected to emitter 51*a* of transistor 52, controls the pulse shaping in an output circuit 60 from transistor 52.

A collector load resistor 61 is connected to output circuit 60 and a ground. A coupling capacitor 62 is connected to output circuit 60.

A resistor 55 is connected to base 51 of transistor 52 and biases base 51 of transistor 52 and acts as a collector load resistor for transistor 41 to permit proper negative pulse amplification.

The bias of transistor 41 is controlled by a resistor 43, a resistor 44, and a resistor 45, as well as by an NPN transistor 80 in an AGC circuit, all of which are connected to the base of transistor 41.

AGC negative voltage is derived at 75 from the last IF section of a transistorized receiver (not shown). This negative voltage is applied by means of circuit 76 and resistor 77 to the base 81 of transistor 80. A filter 82 is provided and connected to circuit 71 to filter out any amplitude change in negative voltage.

Transistor 80 is connected to the base 40 of transistor 41 by means of output circuit 83, and by way of resistor 44.

A circuit 90, to which a resistor 91 is connected, is connected to collector 81*a* of transistor 80 and to supply voltage circuit 100. Circuit 90 and resistor 91 are connected to output circuit 83 and resistor 44 as at 92, so as to change the potential of transistor 80, and in turn to change the bias voltage on base 40 of transistor 41.

A filter 93 is connected to output circuit 83 of transistor 80 and, like filter 82, it filters out any amplitude change in voltage.

It will thus be seen that the amount of pulse amplification in transistor 41 and transistor 52 is controlled solely by the bias conditions of transistor 80. By controlling the gain of transistor 41 and transistor 52 with transistor 80, the negative pulse amplitude can be made to limit RF pulses to the same level as the RF carrier. The reason for controlling gain in transistor 41 and transistor 52, instead of in transistor 30, is to eliminate the possibility of intermodulation.

To summarize, the device of the present invention provides a simplified, automatic means of cancelling AM noise pulses in the IF amplifier section of a receiver by injection at the proper time of negative bias pulses of the proper magnitude and duration. The device of the present invention thereby minimizes the effects of foreign noise pulses and permits effective receiver operation under conditions of low receiver signal strength and high impulse foreign noise levels.

Although the invention has been herein shown and described in what is conceived to be the most practical and preferred embodiment, it is recognized that departures may be made therefrom within the scope of the invention, which is not to be limited to the details disclosed herein, but is to be accorded the full scope of the claim so as to embrace any and all equivalent structures and methods.

What is claimed is:

A pulse gate noise limiter for a transistorized radio frequency communications receiver having a radio frequency signal path, which comprises: first circuit means connected to said radio frequency signal path for sampling the signal in the radio frequency signal path of the receiver; second circuit means connected to said first circuit means for producing D.C. pulses comparable to unwanted noise pulses in the radio frequency signal path; third circuit means connected to said second circuit means and connected to the radio frequency signal path after the connection of said first circuit means, said third circuit means including an electronic circuit element in said radio frequency signal path having means biasable by said D.C. pulses for reducing said unwanted noise pulses; and means for controlling the operating level of said second circuit means, said means comprising a transistorized AGC voltage source in the receiver at a point after the connection of said third circuit means to the radio frequency signal path, and an electrical connection between said source and said second circuit means.

References Cited in the file of this patent

UNITED STATES PATENTS

| | | |
|---|---|---|
| 2,901,601 | Richardson et al. | Aug. 25, 1959 |
| 2,971,164 | Saari | Feb. 7, 1961 |
| 3,014,127 | Vlasak | Dec. 19, 1961 |
| 3,032,704 | Beck | May 1, 1962 |